United States Patent [19]

Ogata

[11] 4,210,876
[45] Jul. 1, 1980

[54] METAL VAPOR LASER

[75] Inventor: Yoshiro Ogata, Ibaraki, Japan

[73] Assignee: Matsushita Electronics Corporation, Kadoma, Japan

[21] Appl. No.: 858,404

[22] Filed: Dec. 7, 1977

[30] Foreign Application Priority Data

Dec. 13, 1976 [JP] Japan .................................. 51-149976

[51] Int. Cl.² .................................................. H01S 3/03
[52] U.S. Cl. ................................................ 331/94.5 G
[58] Field of Search ..................... 331/94.5 G, 94.5 D, 331/94.5 T, 94.5 PE

[56] References Cited

U.S. PATENT DOCUMENTS

| 3,639,804 | 2/1972 | Hernqvist | 331/94.5 G X |
| 3,683,295 | 8/1972 | Hernqvist | 331/94.5 G |
| 3,878,479 | 4/1975 | Heising et al. | 331/94.5 T |
| 3,942,062 | 3/1976 | Hernqvist | 331/94.5 G X |

OTHER PUBLICATIONS

D. A. Chance et al., "Plasma Guides and Shields for He/Ne Gas Lasers", *IBM Technical Disclosure Bulletin*, vol. 19, No. 1, Jun. 1976, pp. 311–312.

*Primary Examiner*—James W. Davie
*Attorney, Agent, or Firm*—Cushman, Darby & Cushman

[57] ABSTRACT

A metal vapor laser discharge tube comprising an anode, a laser capillary, a metal reservoir at one end of the laser capillary, a cathode disposed in coaxial relation with and around the laser capillary, and an air-tight envelope enclosing the cathode and the laser capillary. For prolonging the life of the metal vapor laser discharge tube, the laser further includes a condenser installed in a discharge path between the laser capillary and the cathode and may comprise discharge guiding members.

10 Claims, 8 Drawing Figures

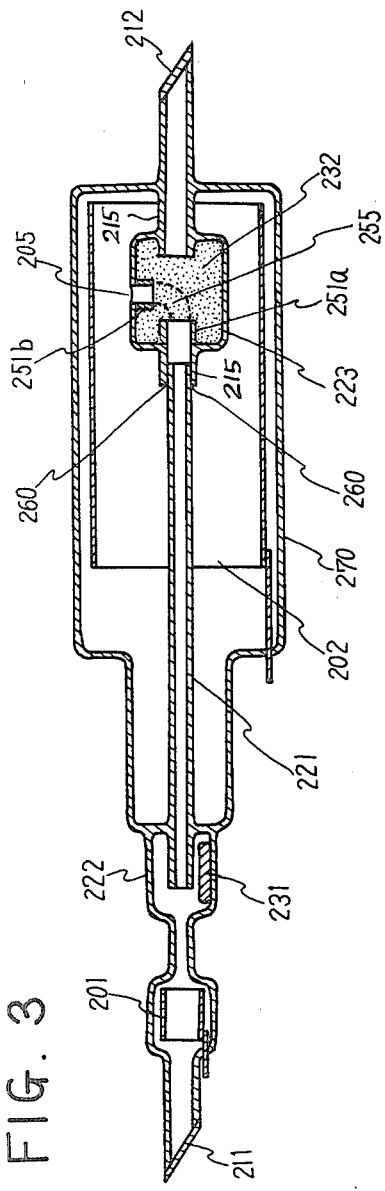
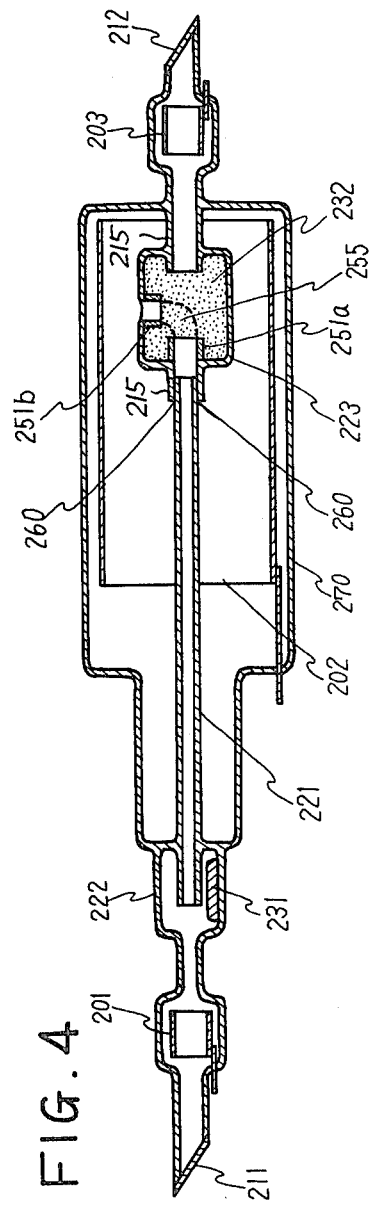

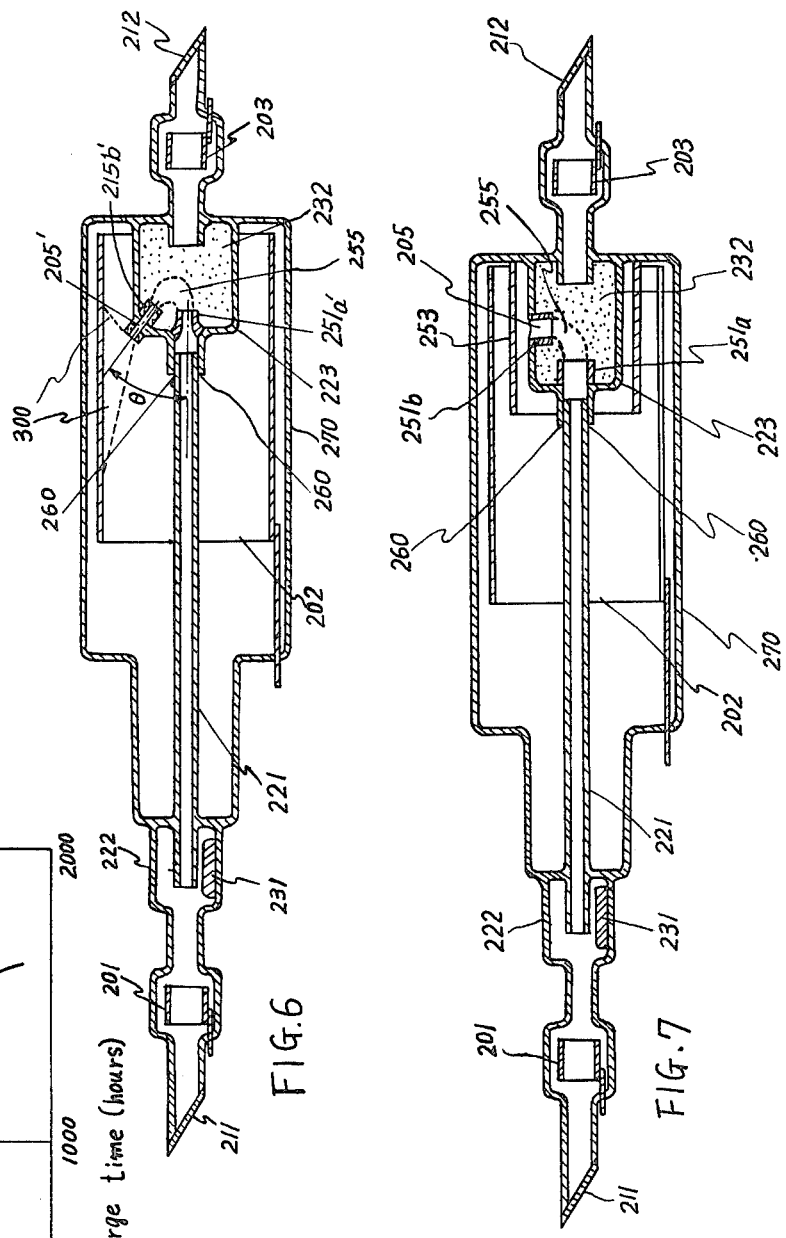

METAL VAPOR LASER

BACKGROUND OF THE INVENTION

This invention relates to an improvement in laser of the type of metal vapor discharge laser.

In recent years, many gas laser tubes, many have been made with the coaxial construction of a laser capillary, a cathode and an enclosure. For instance, helium-neon laser tubes generally adopt such coaxial construction. This is because the coaxial construction allows the laser tube to be made compact and suitable for automatic manufacturing with a high precision.

However, in the conventional coaxial structure metal-vapor gas laser of FIG. 1, wherein lasing is excited by means of discharge in the metal gas, its life is shortened because of sputtering of cathode material around the cathode caused by bombardment of cathode by metal ions in the discharge plasma.

In FIG. 1 which shows one example of the conventional coaxial structure type metal-vapor laser tube, in a glass envelope 170, a laser capillary 121 is disposed on the axis of the envelope 170. A cylindrical cathode 102 is disposed coaxially with and surrounding the laser capillary 121. Between an anode 101 and one end of the laser capillary 121, a reservoir 122 containing a specified amount of metal 131 such as cadmium is connected, in a coaxial relation with the lasing capillary 121. The other end of the laser capillary 121 is supported by one end of a supporting tube 115 which is made of glass and air-tightly connected to the envelope 170. The insertion of the laser capillary 121 in the supporting tube 115 is of normal lax fitting of USAS. At the other end of the supporting tube 115 and at the narrowed end of the envelope 170 containing the anode 101 are provided a pair of known Brewster windows 112 and 111, light passing windows with oblique glass plate, respectively. A discharge passing hole 105 is formed on the supporting tube 115 in a manner to face a part of inside surface of the cathode 102.

Operation, namely lasing of this laser is made by impressing a D.C. voltage across the anode 101 and the cathode 102 and disposing this lasing tube in a known external lasing cavity which comprises a pair of lasing mirrors to be disposed facing both Brewster windows 112 and 111.

The reservoir 122 contains the metal 131 which becomes an laser active medium. When the reservoir 122 is heated, the metal 131 is evaporated and, by means of cataphoresis effect of a discharging, the metal vapor becomes evenly distributed with a specified vapor pressure in the laser capillary 121. The discharge plasma which passes through the laser capillary 121 is led, through the discharge passing hole 105, onto the inside surface of the cold cathode 102 and makes recombination on the inside surface of the cold cathode 102. The metal vapor formed by the recombination is trapped on a part or parts of relatively low temperature of inside face of the envelope 170, thereby forming a vapor-deposited metal film 132 thereon. Hereupon, the discharging plasma led onto the inside surface of the cold cathode 102 contains ions of considerably large momentums. For instance, in a cadmium ion laser utilizing helium gas as the carrier, the discharge plasma contains a considerable amount of cadmium ions. These cadmium ions impact the surface of cold cathode 102 and cause sputtering of cathode material around the cathode. As a result, a deposit layer due to sputtering is formed on the inside surface of envelope 170 at the portion around the cathode 102. The layer of deposit undesirably absorbs the carrier gas, thereby reducing pressure of the carrier gas and causing the life of the tube to decrease.

SUMMARY OF THE INVENTION

The present invention provides a metal vapor laser with having improved performance characteristics.

BRIEF EXPLANATION OF THE DRAWING

FIG. 3 shows a sectional side view of a second example of the laser embodying the present invention.

FIG. 4 shows a sectional side view of a third example of the laser embodying the present invention.

FIG. 5 shows performance characteristic curves.

FIG. 6 shows a sectional side view of a fourth example of the laser embodying the present invention.

FIG. 7 shows a sectional side view of a fifth example of the laser embodying the present invention.

DETAILED DESCRIPTION OF THE INVENTION

Figure 1:
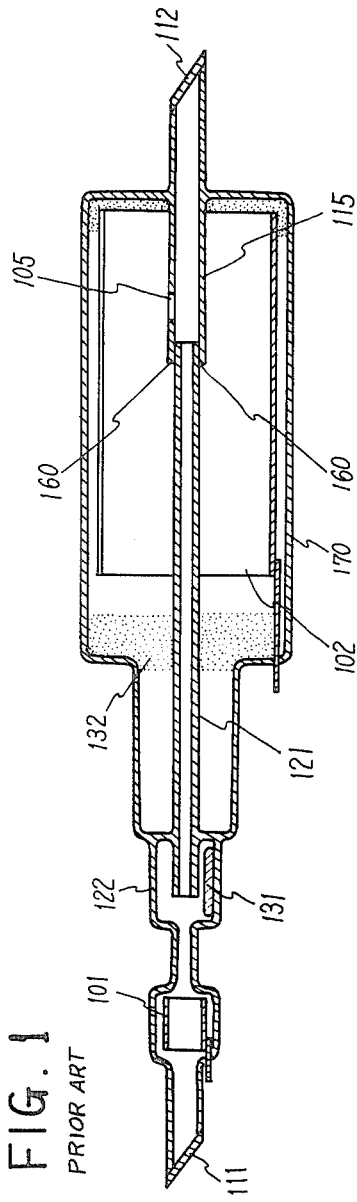
FIG. 1 shows a sectional side view of the conventional laser of metal vapor type.

Hereinafter, the present invention is elucidated in detail referring to the drawings which shows preferred examples of the present invention.

Figure 2A:
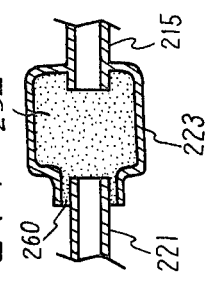
FIG. 2a shows a sectional side view of a part of a modified example.
Figure 2:
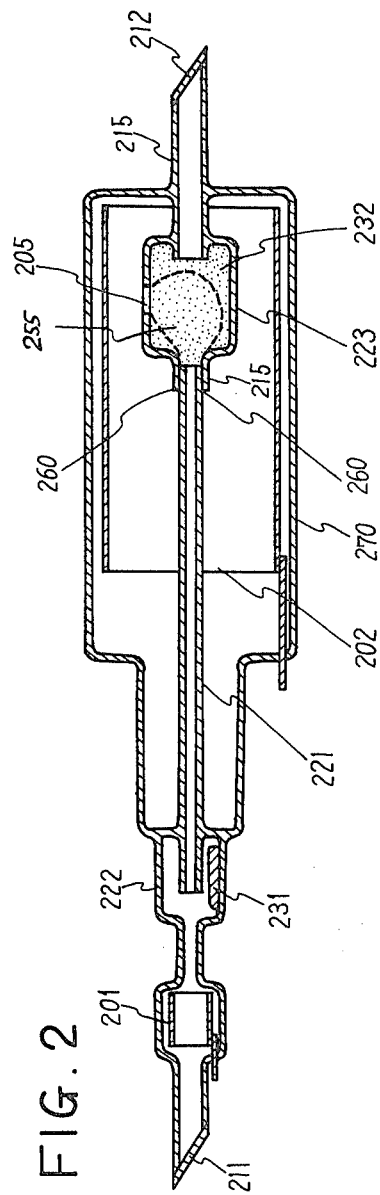
FIG. 2 shows a sectional side view of a first example of the laser embodying the present invention.

In FIG. 2, shows a basic example of the present invention. In FIG. 2, in a glass envelope 270, a laser capillary 221 is disposed on the axis of and in the air-tight glass envelope 270. A cylindrical cathode 202 is disposed coaxially with and surrounding the laser capillary 221. At one end of the laser capillary 221, a reservoir 222 containing a specified amount of metal 231 such as cadmium is connected, and further, on the opposite side of the reservoir 222, an anode 201 is disposed in a coaxial relation with the laser capillary 221. The other end of the laser capillary 221 is supported by insertion in a supporting tube 215 which is made of glass and air-tightly connected to the envelope 270. The insertion of the lasing capillary in the supporting tube 215 is of normal lax fitting of USAS. The feature of the present invention is that the supporting tube 215 has a condenser 223 which is an expanded space in the supporting tube 215 and has a hole 205 on the wall of the expanded part for passing the discharge therethrough. At the end of the supporting tube 215 and at the narrowed end of the enclosure 270 containing the anode 201 are provided a pair of known Brewster windows 212 and 211, light passing windows with oblique glass plate, respectively.

Operation, namely lasing of this laser is made by impressing a D.C. voltage across the anode 201 and the cathode 202 and disposing this laser tube in a known external lasing cavity which comprises a pair of laser mirrors to be disposed facing Brewster windows 212 and 211.

The reservoir 222 contains the metal 231 which becomes an active medium for lasing. When the reservoir is heated, the metal 231 is evaporated and, by means of cataphoretic effect of a discharge the metal vapor becomes evenly distributed with a specified vapor pressure in the laser capillary 221. The discharge plasma which passes through the laser capillary 221 is led in the condenser 223, wherein most of the metal ions are recombined and metal is deposited on the relatively cool parts of wall of the condenser 223, forming a deposited metal layer there. Therefore, the discharge plasma passing through the hole 205 hardly contains any metal ions, namely ions of large momentum, thereby passing substantially rectangular gas flow path 255 and accordingly, due to elimination of bombardment by the ions of large momentum onto the inside face of the cold cathode 202, deposition due to sputtering of the cathode material can be eliminated. As a result of the abovementioned elimination of the deposition, the undesirable absorption of the gas and accompanying decrease of the gas pressure in the laser tube is eliminated, and hence, the life of the laser tube is grately prolonged.

In a modified example, as shown in FIG. 2a, the hole 205 is omitted and a gap between the laser capillary 221 and the supporting tube 215 can be used as a path for the discharge.

FIG. 3 shows a second example wherein the construction of the condenser of FIG. 2 is modified. Namely, discharge guide members 251b and 251a of a short tube shape are attached on the inside face of the condenser at the hole 205 and on the inside face of the condenser at the extended part of the laser capillary 221, respectively. Other parts are similar to the example of FIG. 2. The axis of the short-tube shaped discharge guide members 251a and 251b are disposed with substantially right angle with each other.

In the laser tube of FIG. 3, the discharge plasma which passes through the laser capillary 221 is led from the discharge guide member 251a into the condenser 223, wherein most of the metal ions makes recombination and is trapped to deposit on the relatively cool parts of wall of the condenser 223, forming deposit a metal layer there. Therefore, the carrier gas through the discharge guide member 251b and the hole 205 hardly contains the metal ions, namely ions of large momentum, and accordingly, due to elimination of bombardment by the metal ions of large momentum onto the inside face of the cold cathode 202, deposition due to sputtering of the cathode material on the nearby parts around the cathode can be eliminated. Therefore, the absorption of the carrier gas by the depositions around the cathode 202 is eliminated. Moreover, in the condenser 223, the plasma passes from the narrow discharge guide member 251a into a large space in the condenser 223, and subsequently passes through the narrow discharge guide member 251b. Therefore, the discharge path is confined in a rectangular path 255 shown by the dotted line, while the metal ions having a larger mass than the carrier gas ions can hardly take such rectangular path and are deposited on the inside face of wall of the condenser 223. Therefore, the path of the discharge is sufficiently isolated from the inside wall of the condenser 223, and accordingly, absorption of the carrier gas ions by the deposited film of the metal deposited on the inside face of the condenser is prevented. Thus, the example of FIG. 3 has even a further prolonged life than the example of FIG. 2.

FIG. 4 shows a third example wherein in comparison with the example of FIG. 3, an auxiliary anode 203 is inserted between the condenser 223 and the Brewster window 212, so that a weak discharge is made between the auxiliary anode 203 and the cathode 202.

As a result of the abovementioned construction, among the metal vapor formed by the recombination of the metal ions in the plasma, such portion that diffuses towards the Brewster window 212 is repulsed by the auxiliary anode 203 towards the condenser 223, by means of a cataphoresis formed by the weak discharge. Therefore, contamination of the Brewster window 212, and hence optical loss and resultant shortening of life of the laser tube by deposition thereon of the metal vapor diffused from the condenser 223 can be eliminated. Therefore, the life of the laser is very much prolonged.

FIG. 5 shows performance characteristic curves of the example of conventional metal vapor laser (curve I) and several examples of the present invention (curves II, III and IV for the examples of FIGS. 2, 3 and 4, respectively).

The lasers of the examples of FIGS. 1, 2, 3 and 4 are cadmium vapor laser wherein the metal in the reservoir 131 or 231 is cadmium and helium is used as the carrier gas to obtain the lasing of 4416A of cadmium spectral line.

Details of the conventional metal vapor laser of FIG. 1 is as follows:

| | |
|---|---|
| The laser capillary 121 has the inner diameter of | 2.5 mm |
| the outer diameter of | 8.0 mm |
| and the length of | 2.50 mm |
| The filling pressure of the carrier gas is | 4 Torr. |
| Discharge current is set | 90 ± 2 mA. |
| Temperature of the metal reservoir is set | 240 ± 2° C. |

As shown by the curve I of FIG. 5, the laser output quickly decreases and after about 100 hours from start of the discharge the lasing becomes impossible.

Details of the laser tube of FIG. 2 embodying the present invention is as follows:

| | |
|---|---|
| The laser capillary 121 has the inner diameter of | 2.5 mm, |
| the outer diameter of | 8.0 mm, |
| and the length of | 250 mm. |
| The filling pressure of the carrier gas is | 4 Torr. |
| The condenser 223 has the inner diameter of | 25 mm |
| and the inner length of | 40 mm. |
| The hole 205 has the diameter of | 4 mm. |
| The fitting part 260 between the laser capillary 221 and the supporting tube 215 is | normal lax fitting of USAS. |
| Discharge current is set | 90 ± 2 mA. |
| Temperature of the metal reservoir is set | 240 ± 2° C. |

As shown by the curve II of FIG. 5, the lasing continued for 1600 hours from the start of the discharge. Namely the life of the laser tube is greatly removed in comparison with the conventional metal vapor laser.

In the modified example of FIG. 2a, wherein the hole 205 is omitted and the fitting part 260 between the laser capillary and the supporting tube 251 is made to have 0.5 mm gap inbetween for making the discharge therethrough, the performance curve becomes almost identical to the curve II for the abovementioned example 2 of FIG. 2.

Details of the laser tube of FIG. 3 embodying the present invention is as follows:

| | |
|---|---|
| The laser capillary 121 has the inner diameter of | 2.5 mm, |
| the outer diameter of | 8.0 mm, |
| and the length of | 250 mm |

| | |
|---|---|
| The filling pressure of the carrier gas is | 4 Torr. |
| The condenser 223 has the inner diameter of | 25 mm |
| and the inner length of | 40 mm. |
| The discharge guide members 251a and 251b have the inner diameter of | 4 mm |
| and the length of | 8 mm. |
| The fitting part 260 between the lasing capillary 221 and the supporting tube 251 is | normal lax fitting of USAS. |
| Discharge current is | 90 ± 2 mA. |
| Temperature of the metal reservoir is set | 240 ± 2° C. |

As shown by the curve III of FIG. 5, the lasing continued for over 2000 hours from the start of the discharge. Namely the life of the laser tube is greatly improved.

Details of the laser tube of FIG. 4 embodying the present invention is as follows:

Almost all the data are same with those of the foregoing Example III, except that the discharge current between the auxiliary anode 203 and the cathode 202 is about 10 mA.

As shown by the curve IV of FIG. 5, the lasing continued for longer period than that of the foregoing example 3.

FIG. 6 and FIG. 7 show further modifications capable of achieving better performance characteristics than those of the foregoing examples of FIG. 2, FIG. 3 and FIG. 4.

Namely, in the modified example of FIG. 6, the discharge guide members 251a' and 251b' has an acute angle σ inbetween, namely the angle σ is considerably smaller than 90°. As a result of the acute angle σ, the flow of the discharge through the hole 205' to the electrode is directed to a central part of the cathode 202. Moreover, since the center of the flow has an obliquity against the inside face of the cathode 202, the area covered by the discharge path 300 becomes wider than that in the foregoing examples of FIG. 2, FIG. 3 and FIG. 4. Therefore, a concentration of the discharge current on a small area of the cathode does not take place in the example of FIG. 6, because of effective utilization of almost whole part of the cathode for the discharge. Accordingly, deposit due to sputtering of the cathode material by bombardment of the cathode surface with a concentrated ion flow on a small area thereon is entirely eliminated, and hence, a further improved performance characteristics than any of the foregoing examples shown by the curves of FIG. 5 is achievable.

In the modified example of FIG. 7, a cylindrical discharge guide member 253 is disposed coaxially to and between the outer face of the condenser 223 and the inside face of the cathode 202. The cylindrical discharge guide member 253 is shorter in length than the cathode 202, and is disposed to face the hole 205 or the discharge guide member 251b. By means of the cylindrical discharge guide member 253, the discharge path to the cathode diverges to wide area of the inside face of the cathode 202, and therefore, no adverse concentration of the discharge path on a small area of the cathode 202 takes place. Accordingly, a deposit due to sputtering of the cathode material by bombardment of the cathode surface with a concentrated ion flow on a small area thereon is entirely eliminated, thereby ensuring a further improved performance characteristics than any of the foregoing examples shown by the curves of FIG. 5.

As has been elucidated referring to the various examples, in the laser tube of the present invention having coaxial construction of the lasing capillary, the cathode and the envelope by means of providing the condenser 223 between the laser capillary 221 and the cathode 202, the almost all of metal ions in the discharge plasma recombine and deposit on the inside face of the condenser 223. Accordingly, the bombardment on the inside face of the cathode by the metal ions is almost entirely eliminated, thereby eliminating undesirable deposit due to sputtering of the cathode material and resultant gas pressure decrease. Thus, a drastic prolongation of life of the metal vapor laser is achieved.

What I claim is:

1. A metal vapor laser discharge tube comprising:
   an anode,
   a cathode,
   a laser capillary,
   a metal reservoir disposed at one end of said laser capillary between said anode and said laser capillary,
   an air-tight envelope enclosing said cathode and said laser capillary, and
   a condenser coaxial with said laser capillary and said cathode disposed in a discharge path between said laser capillary and said cathode for condensing metal vapor, said discharge path being formed inside said condenser.

2. A metal vapor laser discharge tube as defined by claim 1, wherein said condenser comprises at least one discharge guiding member for guiding discharge plasma.

3. A metal vapor laser discharge tube as defined by claim 1, further comprising an auxiliary anode disposed between said condenser and a laser light window, said laser light window positioned along said lasing capillary on the opposite side of said metal reservoir from said condenser.

4. A metal vapor laser discharge tube as defined by claim 2, including first and second discharge members wherein the axis of said first discharge guiding member disposed between said laser capillary and said condenser and the axis of said second discharge guiding member disposed between said condenser and a space leading to said cathode form an acute angle.

5. A metal vapor laser discharge tube as defined by claim 2, further comprising a discharge guiding member disposed in a space between a discharge passing hole of said condenser and said cathode.

6. A metal vapor laser discharge tube comprising:
   an anode,
   a cathode,
   a laser capillary,
   a metal reservoir disposed at one end of the said laser capillary between said anode and said laser cappillary,
   an air-tight envelope enclosing said cathode and said laser capillary, and
   a condenser disposed in a discharge path between said laser capillary and said cathode, said condenser including a hole forming a restricted discharge path apart from the wall faces of said condenser inside said condenser.

7. A metal vapor laser discharge tube as defined by claim 6, wherein said condenser comprises discharge guiding members at one end of said laser capillary and at said hole for guiding restricted discharge through said hole.

8. A metal vapor laser discharge tube as defined by claim 6, further comprising an auxiliary anode between said condenser and a laser light window disposed along the axis of said laser capillary and on the opposite side of said metal reservoir from said condenser.

9. A metal vapor laser discharge tube as defined by claim 7, further comprising an auxiliary anode between said condenser and a laser light window disposed along the axis of said laser capillary and on the opposite side of said metal reservoir from said condenser.

10. A metal vapor laser discharge tube as defined by claim 7, wherein the axis of a first discharging guiding member disposed between said laser capillary and said condenser and the axis of a second discharge guiding member disposed between said condenser and a space leading to said cathode form an acute angle.

* * * * *